Sept. 11, 1928.

E. G. SPRUNG 1,684,156

BRAKE

Filed Nov. 12, 1926      3 Sheets-Sheet 1

INVENTOR
Edwin G. Sprung
BY
P. W. Pomeroy
ATTORNEY

Sept. 11, 1928.  E. G. SPRUNG  1,684,156

BRAKE

Filed Nov. 12, 1926  3 Sheets-Sheet 2

INVENTOR
Edwin G. Sprung
BY
P. M. Pomroy
ATTORNEY

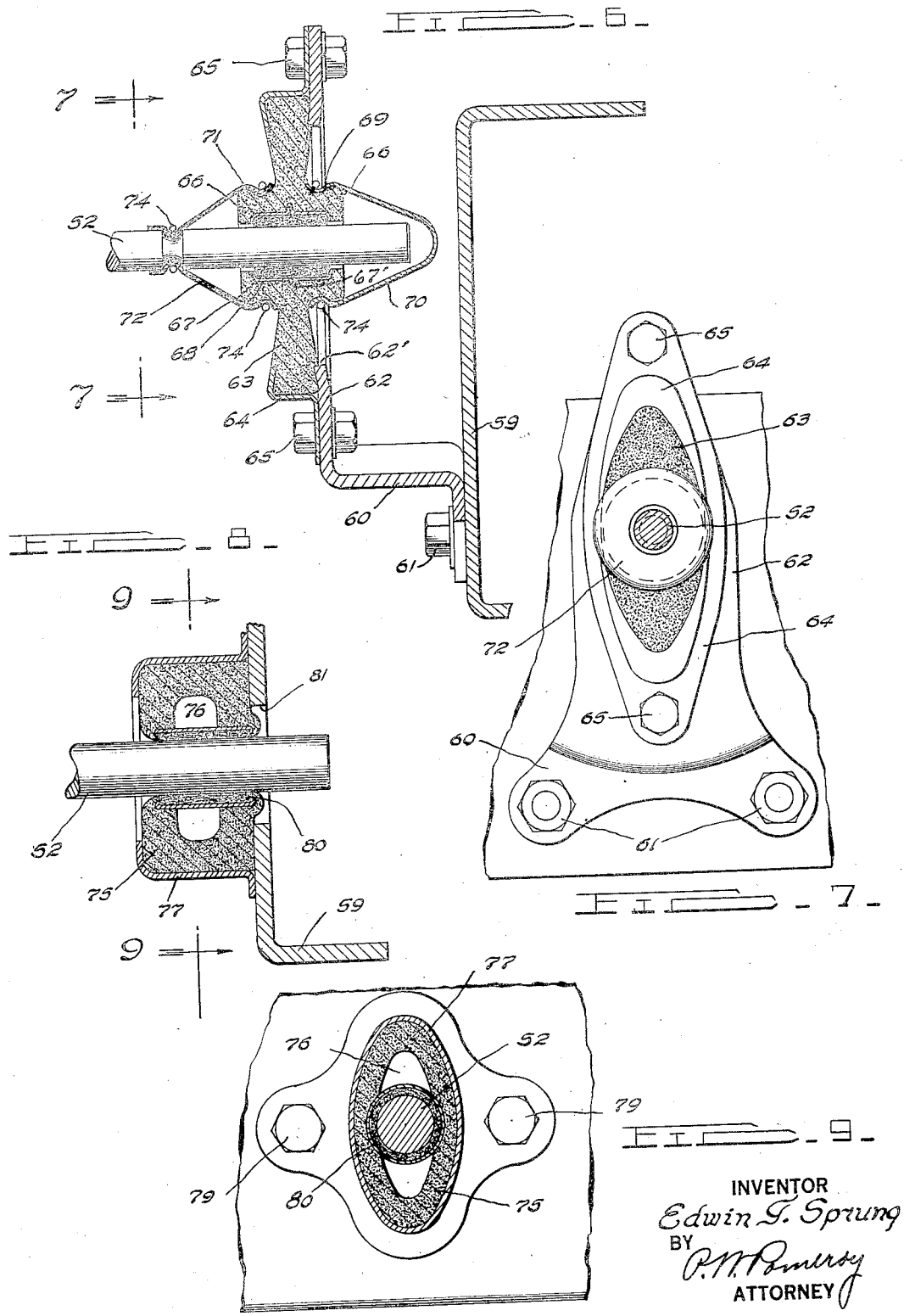

Patented Sept. 11, 1928.

1,684,156

UNITED STATES PATENT OFFICE.

EDWIN G. SPRUNG, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed November 12, 1926. Serial No. 147,975.

This invention relates to a brake mechanism for motor vehicles, and particularly to improved means for supporting the free end of the brake operating shaft at the chassis frame, the principal object being to provide a construction that is simple, efficient in operation and economical to manufacture, especially in large quantities.

Another object is to provide means for supporting the free end of a brake rock-shaft at the frame of a motor vehicle chassis, so as to permit operation of the brake irrespective of the position of the frame relative to the axle on which the brake is supported.

Another object is to provide a flexible block on the vehicle frame to permit flexible connection between a brake rock-shaft and the frame on which the free end of the shaft is supported.

A further object is to provide a vehicle chassis frame with rubber block members for supporting the free ends of the operating shafts of the front wheel brakes, the rubber block members being capable of flexing in a vertical plane and allowing the shafts to rotate therein, irrespective of the position of the frame relative to the axle.

These being among the objects of the present invention, the same consists of certain features of construction and combinations of parts to be hereinafter described with reference to the accompanying drawings, and then claimed, having the above and other objects in view.

In the drawings which illustrate a suitable embodiment of the present invention, Figure 1 is a vertical section taken through the left front wheel and adjacent frame side member of a motor vehicle chassis showing the method of supporting the inner end of the brake rock-shaft in accordance with the present invention.

Figure 3 is an enlarged vertical section taken on the line 3—3 of Figure 2 showing the universal connection between the operating cam and operating shaft.

Figure 6 is a vertical section of the connection between the inner end of the brake operating shaft and the frame side rail.

Figure 7 is an end view of the rock-shaft support shown in Figure 6.

Figure 8 is a vertical section of a modification of the present invention.

Figure 9 is a section taken on the line 9—9 of Figure 8.

Figure 1:
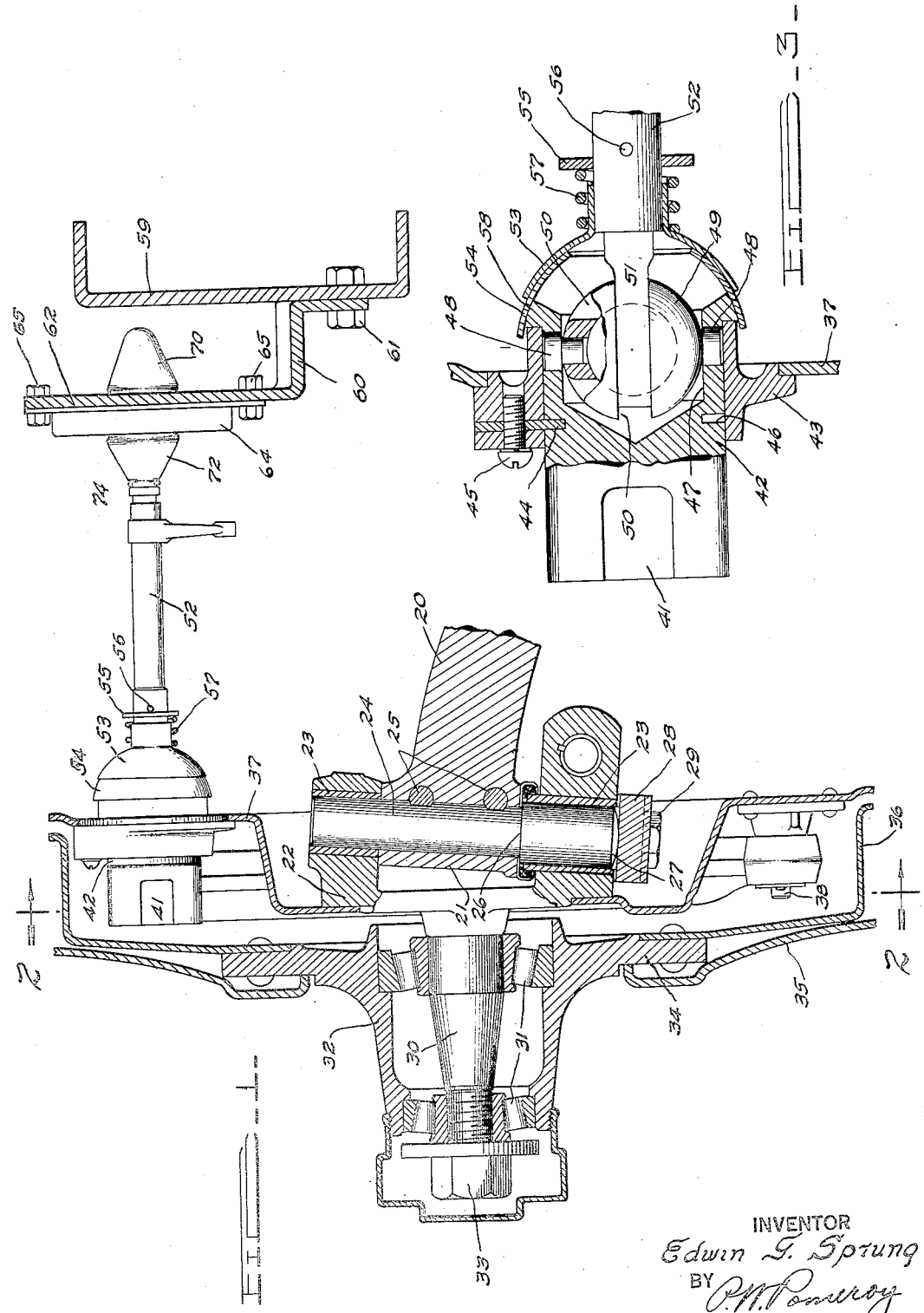

Referring to the accompanying drawings in which like numerals refer to like parts throughout the several views, the embodiment of the present invention is shown in connection with the front wheel brake mechanism of a motor vehicle, to which it is particularly adapted. Shown in Figure 1 is a front axle 20 formed with a steering head 21 of a height greater than the height of the axle section, and having a forked steering knuckle 22, provided with bushings 23, pivoted on the steering head 21 by means of a pivot pin 24 secured therein by retaining pins 25. The ends of the pivot pin 24 extend into the knuckle bearings 23, and the lower end is enlarged to form a shoulder 26 which bears against the under surface of the head 21, thus relieving the securing pins 25 of the strain imposed thereon by the weight of the vehicle. The lower end face 27 of the pin 24 is rounded and bears against a hardened plate 28 secured to the lower fork of the knuckle 22 by bolts 29, to transmit the weight, just mentioned, to the knuckle 22. The knuckle 22 is formed with the conventional outwardly projecting wheel spindle 30 carrying outer and inner bearings 31, which rotatably support the wheel hub 32. The hub 32 is held in place on the spindle 30 by a nut 33 threaded thereonto, and is provided with a flange 34 to which the wheel web 35 and brake drum 36 are secured in concentric relation therewith. A dust cover 37 is secured to the knuckle 22 to close the open end of the brake drum 36.

Figure 2:
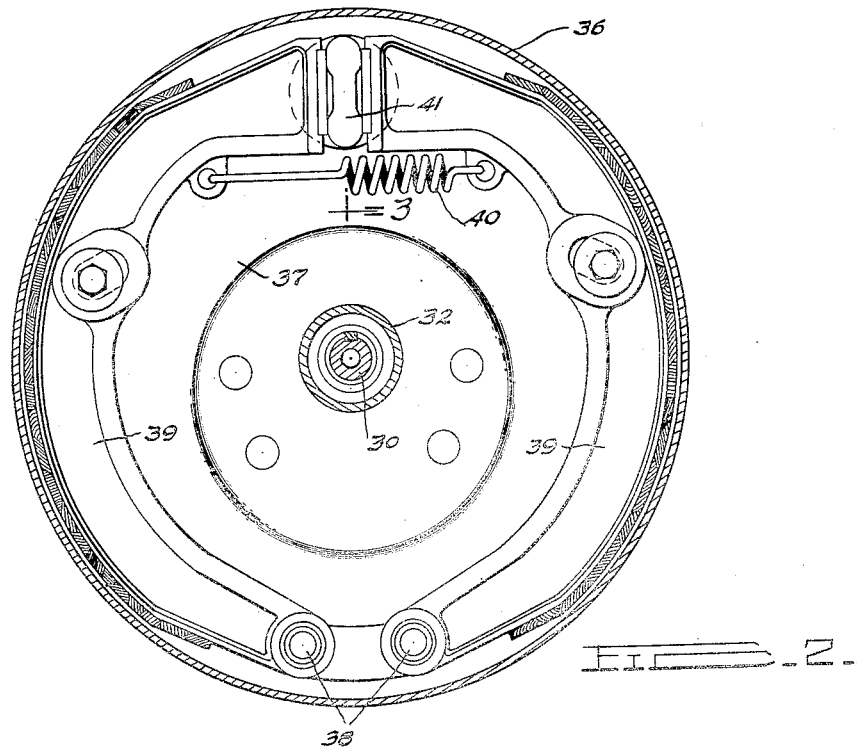
Figure 2 is a section taken on the line 2—2 of Figure 1 showing the brake shoe and coacting operating cam.
Figure 4:
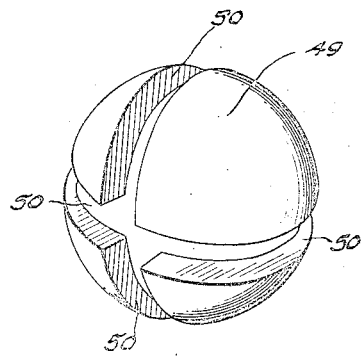
Figure 4 is an enlarged perspective view of the universal ball shown in Figure 3.
Figure 5:
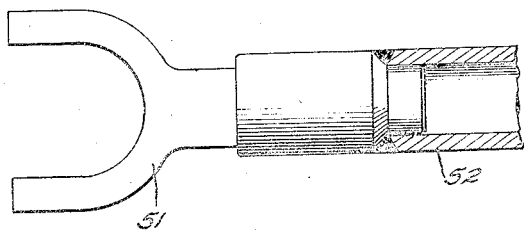
Figure 5 is a plan view of the yoke end of the rock-shaft shown in Figure 3.

Within the brake drum 36, more clearly shown in Figure 2, and pivotally supported on adjacent pins 38 secured to the dust cover 37 are brake shoes 39, the outer surfaces thereof lying just out of contacting relationship with the inner surface of the drum 36. The free ends of the shoes 39 are drawn inwardly by a coil spring 40 to contact with the operating cam 41. The cam 41, as shown in Figure 3, is formed on the end of a short shaft 42 which projects through the dust cover 37 and is rotatably carried by a bracket 43 secured to the dust cover 37. Longitudinal movement of the shaft 42 is prevented by means of a flat key 44, held in the bracket 43 by a screw 45, which projects into and rides in a circumferential groove 46 formed in the shaft 42. The inner end of the shaft 42 is formed with a concentric opening 47 and has oppositely disposed pins 48 projecting inwardly from the walls thereof, which opening 47 receives a universal ball member 49, having circumferential grooves 50 cut therein at right angles to each other. The pins 48 ride in one of the grooves 50 of the ball 49 and a bifurcated member 51 secured to the end of the brake cam rock-shaft 52 seats in the other of the grooves 50. This universal joint connection just described allows the cam 41 to be rotated while the shaft 52 is in any angular position. A dust cap, comprising two spherical shells 53 and 54 bearing against each other, is mounted on the shaft 52 by means of a washer 55, a stop pin 56, and a compression spring 57 which forces the shell 54 to ride on the outer spherical shaped edge 58 of the shaft 42, to provide means for excluding dust and dirt thereby permitting easier operation of the brake parts.

In the construction of this type wherein the brake rock-shaft is supported at one end by the chassis frame and at the other end on the end of the axle or a part carried thereby, the distance between the point of support on the frame and the point of support on the axle varies with the movement of the axle relative to the frame. This is due to both horizontal and vertical movement of the springs which support the frame on the axle. In the case of the free or inner end of the rock-shaft being supported at the chassis frame as in the present invention, there is a tendency, upon movement of the axle relative to the frame or vice versa, for the rock-shaft to pivot in a vertical plane about its point of support at the frame. When excessive movement occurs the distance between the two points of support for the rock-shaft is of such magnitude that merely vertical pivoting of the shaft about its inner support will not be sufficient to compensate for the same, so sliding action for the inner end of the rock-shaft, as well as this pivotal movement, must be provided. It is this particular feature to which the present invention relates, wherein a support for the inner end of the brake rock-shaft is provided to compensate for the varying angularity of the shaft and the varying distance between the points of support.

A bracket 60 is secured to the frame side rail 59 by means of bolts 61, and is provided with a vertical portion 62 having an elliptical-shaped aperture 62'. An oblong rubber block 63 of somewhat greater height than width, formed into a flanged shell or rim 64 is secured to the bracket 60 by the bolts 65 passing through the upper and lower portions of the rim 64 to clamp the block 63 firmly against the vertical portion 62 of the bracket 60, to thereby support the free end of the rock shaft 52.

The block 63 is provided with a central bearing 68 of graphite-impregnated fabric, or other material having dry lubricating properties, contained within a metallic shell 67 having a centrally positioned peripheral flange 67' around which the rubber constituting the block member 63 is formed. The bearing 68 slidably and rotatably receives and supports the free end of the brake rock-shaft 52, the operation of the same being described more fully later on in the specification. Hubs 66 are provided on each side of the blocks 63 around the bearing 68 to enable a thinner and therefore a more flexible web portion to be used.

The hub portion 66 which projects through the opening 62' in the bracket portion 62 is formed with a circumferential depression 69 to provide a seat for the edge of a dust excluding cover 70 concealing the end of the rock-shaft 52. A similar depression 71 is formed in the other hub portion 66 to provide a seat for one end of a dust boot 72 of leather or similar flexible material, the other end being seated in a circumferential groove 73 provided in the rock-shaft 52. Split spring rings 74 or similar means are provided to retain the ends of the dust cover 70 and boot 72 in their respective seats. The dust cover 72 and boot 74 exclude all dust dirt and water from the bearing 68, thereby allowing easy operation of the shaft.

When a vehicle equipped with brakes on the steering wheels is in operation, the action of the springs which support the chassis frame on the axle creates relative movement between the axle and frame. The relative movement between these parts causes the distance between the point of support of the brake rock-shaft 52 on the axle 20 and the point of support on the frame member 59 to vary, and in so doing, the brake rock-shaft 52 pivots in a vertical plane about the support at the frame member 59. When the shaft 52 pivots in this manner, it causes the rubber supporting block 63 to flex upon pivotal movement of the end of the shaft and bearing 68, and at the same time the end of the shaft 52 will slide longitudinally in the bearing 68. The rubber block 63 having a somewhat greater length than width allows maximum pivotal movement of the rock-shaft 52 in a vertical plane. Flexibly and slidably supporting the end of the rock-shaft in this manner allows the same to be rotated to supply the brakes irrespective of the angular position thereof. The rubber block 63 is preferably of small width so that it will have minimum compression in a horizontal plane perpendicular to the axle of the rock-shaft 52, thereby to absorb the horizontal shocks caused by the pull exerted in applying the brakes.

In Figures 8 and 9, a modified form of the present invention is shown which comprises a molded rubber block 75, having a hollow center 76, supported in a rim 77 secured directly to the frame side rail 59 by means of bolts 79. Centrally positioned in the block 75 is a bearing 80 of graphite-impregnated fabric or the like. The bearing 80 slidably and rotatably carries the free end of the brake rock-shaft 52, the extreme end thereof extending through an enlarged opening 81 in the side rail 59. The action of the modified form of support is substantially the same as that of the support previously described, the sides of the block 75 being flexed outwardly or inwardly by the changing angularity of the shaft 52. The rock-shaft 52 is, of course, free to rotate, irrespective of the position of the frame 58 relative to the axle 28.

From the description of the construction comprising the present invention and of the modified form thereof the advantages of this invention are readily apparent.

Formal changes may be made in the specific embodiment of the invention described, without departing from the spirit and substance of the broad invention, the scope of which is commensurate with the appended claims.

What I claim is:

1. In a brake for a vehicle steering wheel pivoted at the end of an axle supporting a chassis frame, a shaft connected at one end to said brake, a flexible block secured to said frame, and a bearing member supported by said flexible block for supporting the inner end of said shaft.

2. In combination with a vehicle brake associated with a steering wheel and a chassis frame, a mounting for supporting an end of a brake operating part, said mounting comprising a casing, and a formed rubber member secured therein, said casing being supported by said frame and having an opening to allow said end of said brake operating part to be carried by said rubber member.

3. In a brake for a vehicle steering wheel pivoted at the end of an axle supporting a chassis frame, a movable shaft for operating said brake, and a rubber mounting supported by said frame for supporting the inner end of said shaft, said mounting flexing to allow movement of said shaft.

4. In combination with a vehicle brake associated with a steering wheel, a chassis frame member, a supporting frame secured to said frame member, a rubber member secured within said supporting frame, and a rock-shaft connected at one end to said brake and carried at the other end by said rubber member, said rubber member flexing to compensate for movement of said rock-shaft relative to said frame member.

5. In a motor vehicle, the combination with a brake associated with a steering wheel, of a rock-shaft secured at one end to said brake and pivotally carried at the other end by a support secured to a portion of said vehicle movable relative to said wheel, said support comprising a framed rubber member having a bearing contained therein for receiving said last-mentioned end of said shaft.

6. A support for a brake cam operating shaft comprising a rubber member molded into a metallic supporting rim, and a bearing vulcanized to the interior of said member.

7. A support for a brake cam rock-shaft comprising a metal rimmed rubber member having a transverse opening therein, and a bearing positioned in said opening and vulcanized to the walls thereof.

8. In a support for a brake rock-shaft, a formed rubber member provided with an aperture, a circumferential groove in the walls of said aperture, and a cylindrical bearing having a circumferential flange engaging said groove, said bearing receiving the free end of said rock-shaft and said rubber member flexing to compensate for movements of said rock-shaft.

9. A support for holding the end of a pivotal shaft for maximum vertical pivotal movement and a minimum lateral displacement, comprising a rubber member of substantially greater height than width, said shaft engaging the central portion of said member.

10. A support for holding the end of a pivotal shaft for maximum vertical pivotal movement and minimum lateral displacement, comprising a rubber member of substantially greater height than width and having an enlarged central hub portion, said shaft slidably engaging the central hub portion of said member.

11. A support for holding the end of a pivotal shaft for maximum vertical pivotal movement and minimum lateral displacement, comprising a rubber member of substantially greater height than width, said shaft slidably engaging the central portion of said member, and a metal support engaging the perimeter of said member.

12. In a brake mechanism, means for supporting a brake shaft for maximum pivotal movement thereabout in a vertical plane and maximum resistance to displacement laterally of and perpendicularly to said shaft, said means comprising a resilient member of greater height than width provided with a central bearing and a marginal frame.

13. A support for a shaft comprising a rubber member of greater height than width whereby maximum flexure therein is provided in a vertical plane.

14. A support for a shaft, comprising a rubber member of greater height than width whereby maximum flexure therein is provided in a vertical plane, and maximum resistance to compression therein is provided in a horizontal plane perpendicular to the axis of said shaft.

15. A support for a shaft providing maximum pivotal movement thereabout in a vertical plane and minimum lateral movement in a horizontal plane perpendicular to the axis of said shaft, comprising a rubber member of substantially greater height than width and a bearing member centrally carried by said rubber member.

16. In a motor vehicle, a support for a brake cam operating shaft comprising a flexible member supported by the frame of said vehicle above and below said shaft, and a bearing in said flexible member for said shaft permitting greater vertical pivotal movement than the lateral displacement thereof.

17. In a motor vehicle, a support for a brake cam operating shaft comprising a flexible member secured to the frame of said vehicle above and below said shaft, and a non-metallic bearing for said shaft mounted in said flexible member intermediate the securing means to permit greater vertical pivotal movement of said shaft than the lateral displacement thereof.

18. In a motor vehicle, a support for a cam operating shaft comprising a rubber member supported by the frame of said vehicle above and below said shaft, and a bearing for said shaft seated in said rubber member to permit greater vertical pivotal movement than the lateral displacement thereof.

19. In a motor vehicle, a support for a brake cam operating shaft, comprising a flexible member of greater height than width supported by the frame of said vehicle, and means for securing said member to said frame above and below said shaft.

20. In a motor vehicle, a brake operating mechanism therefor comprising a resilient member for supporting a shaft extending between the vehicle frame and a road wheel, said member permitting substantial vertical movement of said shaft and preventing substantial lateral movement thereof.

Signed by me at Detroit, Michigan, this 3rd day of November, 1926.

EDWIN G. SPRUNG.